United States Patent

Kaphengst et al.

[11] 4,121,371
[45] Oct. 24, 1978

[54] ELECTRICAL INSECT KILLING APPARATUS

[75] Inventors: Elmer Kaphengst, Burlington, Wis.; Weldon Birdwell, Buffalo Grove, Ill.

[73] Assignee: Beatrice Foods Co., Bristol, Wis.

[21] Appl. No.: 730,599

[22] Filed: Oct. 7, 1976

[51] Int. Cl.² ............................................. A01M 1/22
[52] U.S. Cl. ................................................... 43/112
[58] Field of Search ...................... 43/98, 99, 112, 113

[56] References Cited

U.S. PATENT DOCUMENTS

| 3,986,292 | 10/1976 | Klebanoff | 43/112 |
| 3,998,000 | 12/1976 | Gilbert | 43/112 |

Primary Examiner—Russell R. Kinsey
Assistant Examiner—Robert P. Swiatek
Attorney, Agent, or Firm—Patrick F. Bright

[57] ABSTRACT

An electrical insect killing apparatus includes a killing unit having a light source for attracting insects surrounded at least in part by electrodes for electrocuting such insects, and a perforate enclosure for the killing unit detachably joined at one end to a switch housing a light source having a removable cover and housing a switch for interrupting the flow of electricity to the killing unit. The cover and the perforate enclosure co-act to close the switch when both are joined to the apparatus. However, detachment of either from the apparatus opens the switch.

10 Claims, 6 Drawing Figures

U.S. Patent     Oct. 24, 1978     4,121,371
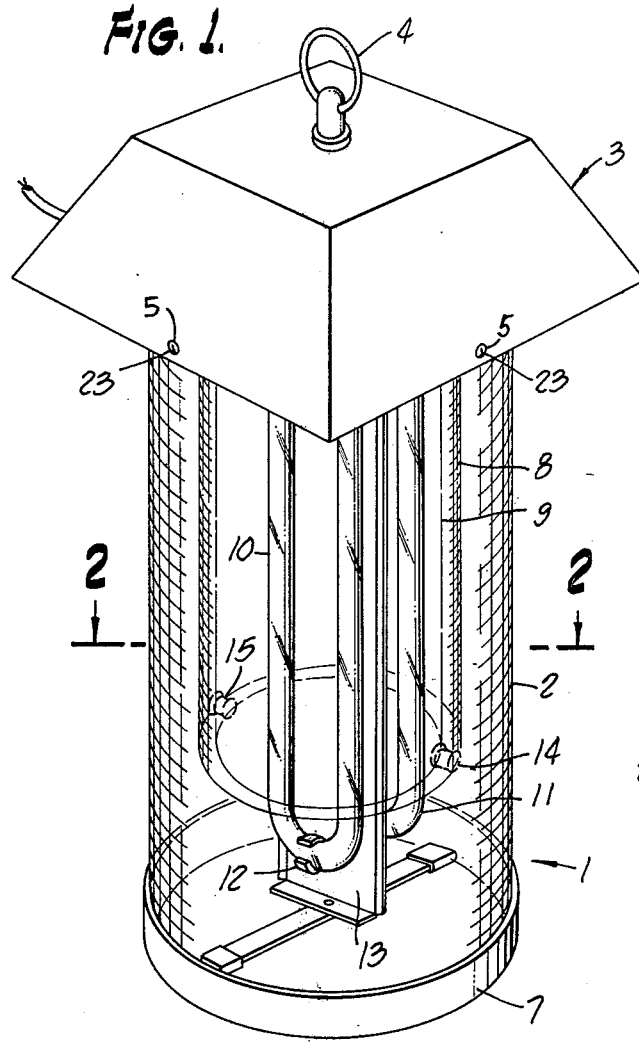
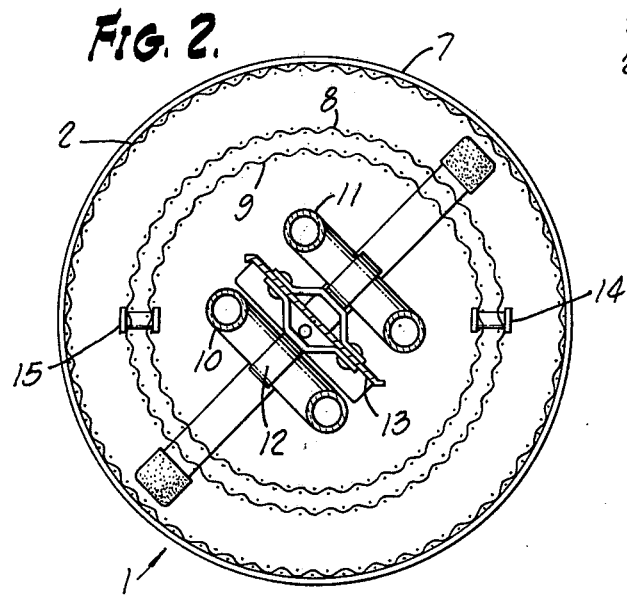
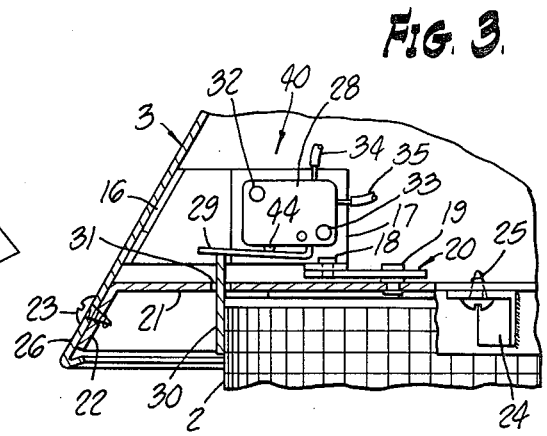
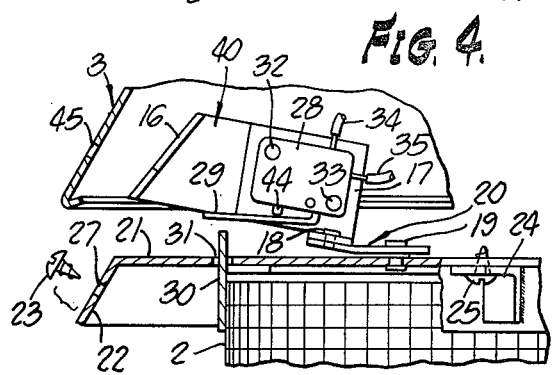
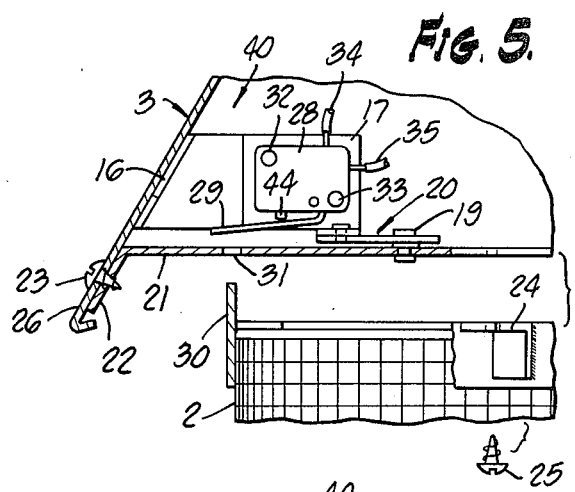
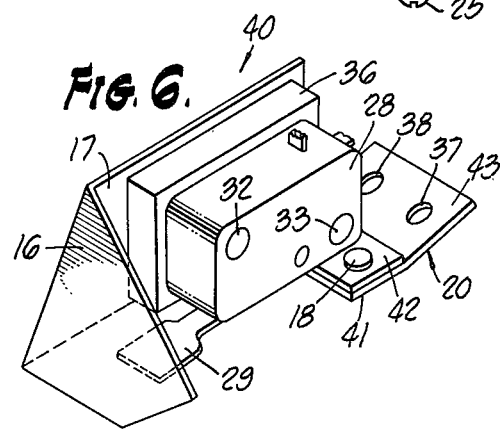

ELECTRICAL INSECT KILLING APPARATUS

This invention relates to an electrical insect killing apparatus, and particularly to a vertically disposed electrical insect killing apparatus.

Many different kinds of electrical insect killing apparatus are described in the prior art. Thus, for example, U.S. Pat. Nos. 1,848,614 and 2,132,371 describe vertically disposed electrical insect killing apparatus; U.S. Pat. Nos. 3,768,196 and 3,894,351 describe horizontally disposed electrical insect killing apparatus, and U.S. Pat. Nos. 3,346,988, 190,124 and 3,680,251 describe still other kinds of electrical insect killing apparatus. None of these patents, however, discloses an insect killing apparatus that combines all of the features of the apparatus of this invention.

This invention provides an electrical insect killing apparatus comprising a killing unit that includes means for attracting insects, and electrode means for electrocuting insects that enclose, at least in part, the attracting means. The apparatus also includes perforate, preferably meshed, enclosure means for the killing unit detachably joined at one end to switch housing means that houses switch means for interrupting electrical flow to the killing unit. The switch housing means has removable cover means that includes means that act to engage and close the switch means where the cover means is joined to the apparatus, provided the perforate enclosure means is also joined to the apparatus. Similarly, the perforate enclosure means includes means that act to engage and close the switch means where the perforate enclosure means is also joined to the apparatus. Thus, to close the switch, both must be joined to the apparatus; their co-action closes the switch. However, if either the perforate enclosure means or the cover means is disengaged from the apparatus, the switch opens.

The attracting means of the killing unit preferably includes one or more fluorescent tube means, more preferably black fluorescent tube means, and most preferably U-shaped black fluorescent tubes. These tubes may run only part of the length of the perforate enclosure, but preferably run substantially the entire length of the enclosure. They may be mounted at one end in a socket, and at the other, by bracket or clamp means. Preferably, the means for attracting insects also includes one or more reflective baffles disposed adjacent to at least part of, and more preferably to the entire length of the fluorescent tube means, to reflect and diffuse light from the fluorescent tube means, thus optimizing attractiveness of the light to insects. The preferred embodiment of the attracting means includes two U-shaped fluorescent tube means disposed parallel to, and separated from one another by a pair of reflective baffles that are at least coextensive with these fluorescent tubes, thus providing an attraction to insects in all directions.

The electrode means in the killing unit of the new apparatus preferably comprises two concentric, spaced apart, perforate (preferably meshed) electrode means that are maintained in a spaced apart relationship, such as by one or more insulating spacers. Preferably, these concentric electrodes surround the fluorescent tube means and reflective baffles, if any, and are coextensive with such tube means to insure that any insect approaching the attracting means must attempt to pass through them.

The detachable perforate enclosure means for the killing unit comprises a plurality of apertures large enough to admit insects, but small enough to preclude entry by small animals, human fingers and the like. In the preferred embodiment, apertures are formed by a coarse mesh. At one end of this perforate enclosure means is switch housing means that includes switch means for interrupting electrical flow to the killing unit. This switch housing means has a removable cover means that includes means which act to engage and close the switch means of the apparatus where both the enclosure means and removable cover means are joined to the apparatus.

In the preferred embodiment, the apparatus is vertically disposed, and has, at the bottom of the perforate enclosure means, a collection means for receiving the incinerated and electrocuted remains of insects killed by the electrode means. This collection means may be a tray or cap that is detachable from the perforate enclosure means to permit cleaning.

The switch housing means of this apparatus include means for electrically energizing the killing unit, and switch means for interrupting electrical flow to the energizing means. In the preferred embodiment the switch housing means include plate means that carries the switch means and the means for electrically energizing the fluorescent tubes means and electrodes of the killing unit. Joined to the perforate enclosure means is at least one projection means that protrudes sufficiently far from the enclosure means to pass through the plate means when the enclosure means is joined to the apparatus. The removable cover means fits over, and when in place, rests atop the plate means. When both the cover means and the enclosure means are joined to the apparatus, the projection means and cover means each engage and co-act to close the switch means. However, where either the enclosure means or the cover means is detached from the apparatus, the switch is opened, de-energizing the killing unit.

In the preferred embodiment, the switch means includes a switch having a pair of leads that must be joined to close the circuit through the switch. Typically, a button actuator in the switch performs this function. The switch also includes a spring adjacent to the button actuator that is normally biased to release the button and open the circuit between the leads. Movement of the spring against the button actuator acts to depress the actuator and close the circuit between the leads.

In the preferred embodiment, the switch is mounted on the plate means by switch carrying means that urge the spring and button actuator upwardly and away from the plate means. This switch carrying means has three portions. The first is a relatively flat portion joined to the plate means at an angle with respect to the plate means in the range of about 5° to about 25°, preferably about 10° to about 15°. A second relatively flat portion, disposed at approximately a 90° angle to the first portion, is joined to the switch with the button-operated switch actuator disposed downwardly toward the plate means and with the spring disposed below the button. The third portion is joined to the second, and is positioned to engage the inner wall of the cover means where the cover means is joined to the apparatus. Preferably, this third portion is a relatively flat plate disposed at an angle complemenary to the interior wall of the closure means.

When the cover means is placed on the switch housing means, the interior of the cover means engages the third portion of the switch carrying means and pushes the switch carrying means, the switch mounted thereon, and the button actuator and spring attached to the switch toward the plate means. In this position, the spring and button actuator are sufficiently close to the plate means to permit engagement of the spring and the projection joined to the enclosure means where the perforate enclosure means is joined to the apparatus. This is possible because the projection means is sufficiently long to pass through the plate means, and to engage and depress the spring means and the switch actuator, thus closing the circuit between the leads of the switch. Where the cover means is detached from the apparatus, however the switch cover means moves the switch sufficiently far from the plate means to preclude engagement of the projection and the switch even when the perforate enclosure is joined to the apparatus.

Referring now to the drawings:

FIG. 1 is a perspective view of the new apparatus;

FIG. 2 is a sectional view of the new apparatus taken on line 2—2 of FIG. 1;

FIG. 3 is an enlarged fragmentary view shown partly in cross-section and partly in side elevation of a portion of the new apparatus that includes a switch means with the switch closed with the means for attaching the perforate enclosure to the switch housing means shown in side elevation;

FIG. 4 shows a view similar to that in FIG. 3 with the cover means removed and the switch open;

FIG. 5 shows a view similar to those in FIGS. 3 and 4 with the cover means on the switch housing means, the perforate enclosure means detached from the apparatus, and the switch in the open position; and FIG. 6 shows a perspective view of the switch and switch carrying means.

FIG. 1 shows electrical insect killing apparatus 1 that includes a killing unit comprising fluorescent U-shaped tubes 10 and 11 disposed vertically beneath removable cover 3. Fluorescent tube 10 is mounted in a socket beneath cover 3 (not shown in FIG. 1) and is joined to reflective baffle 13 by means of C-clamp 12. Baffle 13 is preferably made from a reflective material such as anodized aluminum, and reflects and diffuses light from tube 10 over wide areas surrounding the apparatus. A similar clamp and reflective baffle are mounted adjacent to tube 11.

Surrounding fluorescent tubes 10 and 11 and the reflective baffles behind these tubes are concentric, meshed grid electrodes 8 and 9 that are maintained in spaced-apart relationship by means of insulative spacers 14 and 15, which may be made of material such as plastic. Surrounding the entire killing unit is cylindrical, vertically disposed, coarsely meshed enclosure 2, which is detachably joined to the switch housing means beneath cover 3 at one end by means of bracket 24 and removable screw means 25, and detachably joined to insect collection tray 7 at its other end. Cover 3 is held in place at the top of insect killer 1 by means of screws fitting through openings 5, and the apparatus may be hung, as from the ceiling of a room, by means of a device such as ring 4 which is mounted to a post on cover 3.

FIG. 3 shows an exploded cross-sectional view of the switch means housed beneath cover 3 of the apparatus shown in FIG. 1. In FIG. 3, frustoconical shaped removable cover means 3 sits atop plate means 21, which has downwardly angled side 22. Side 26 of cover 3 fits closely over side 22 of plate 21, and is held in place by screw 23 which passes through both side wall 26 of cover means 3 and side 22 of plate 21. With cover 3 in place atop plate means 21, the interior of side wall 26 engages third portion 16 of switch carrying means 40, and pushes the switch carrying means and switch 28 mounted thereon downwardly toward the plane of plate means 21.

As seen in detail in FIG. 6, switch 28 is mounted to insulating block 36 by means of screws 32 and 33 that pass through swtich 28 and into insulating block 36. Block 36 in turn is mounted on the second portion 17 of switch carrying means 40. Leaf spring 20 is joined to third portion 42 of switch carrying means 40 by rivets 18 or other means. Leaf spring 20 has a first portion 43 that has openings 37 and 38 through which the first portion may be mounted on plate means 21 by rivets 19 or other suitable means. Second portion 41 of leaf spring 20 forms an angle of about 10° with respect to the plane of portion 43 and plate means 21, and tends to hold switch carrying means 40 upwardly and away from plate means 21. Engagement of the interior wall 26 of cover means 3 with third portion 16 of switch carrying means 40 urges the switch carrying means and spring 29 mounted on switch 28 downwardly toward plate 21. Switch 28, as seen in FIG. 3, also includes actuator 44, which normally projects downwardly from switch 28. In this position, the circuit between leads 34 and 35 passing into and out of switch 28 is open.

As FIGS. 3 and 4 show, movement of switch carrying means 40 downwardly toward the plate means 21 brings spring means 29 into contact with upward projection 30 from enclosure means 2. Projection 30 protrudes upwardly through opening 31 in plate means 21, and engages and pushes spring means 29 upwardly. This action brings spring means 29 into engagement with button 44, which is pushed upwardly into switch 28, closing the circuit between leads 34 and 35.

As FIG. 4 shows, removal of cover means 3 from plate means 21 (following removal of screw 23 from opening 45 in cover means 3 and opening 27 in side 22), disengages the interior of cover 3 from third portion 16 of switch carrying means 40, thus permitting spring means 20 to urge switch carrying means 40 and switch 28 upwardly. This upward movement permits spring 29 to disengage from actuator 44, which in turn moves to open the circuit between leads 34 and 35.

As FIG. 5 shows, disengagement of enclosure means 2 from plate means 21 removes protrusion 30 from opening 31, permitting spring 29 and actuator 44 to move downwardly and open the circuit between leads 34 and 35, even though switch carrying means 40 is held close to plate means 21 by the force cover means 3 exerts on third portion 16 of means 40. Thus, this apparatus, including its associated switch means, insures that the flow of electricity to the electrode will be interrupted when either the cover means 3 or perforate enclosure means 2 is not joined to the apparatus.

With the switch means closed, electricity flows to the killing unit, illuminating the fluorescent tubes, and energizing the electrodes. Insects are attracted by the glow of the tubes and the diffused glow from baffles 13, and pass through meshed enclosure 2 and into the space between electrodes 8 and 9 in an effort to approach the tubes.

In general, whenever two charged conductive elements are placed near one another, an energy storing electric field exists between them. In this apparatus, the electrodes are connected in parallel with the transformer secondary of a power supply so that the transformer and the capacitance of the electrodes form a "tank circuit" which can store considerable energy. If a low impedance object such as an insect touches both electrodes simultaneously, a large current flows through the low impedance and dissipates the stored energy rapidly. Similarly, if a small insect flies between the electrodes without touching both simultaneously, the insulation of the dielectric between the electrodes is reduced and a discharge of current will "arc" through the insect. In any event, the flow of current through the insect will incinerate it.

Because the current discharged through an insect exceeds the current capacity of the power supply to the tank circuit, a low current power supply may be used. This arrangement allows the use of a power supply without current limiting means. A person or small animal inadvertently touching both grids would receive a harmless, brief, high energy shock.

What is claimed is:

1. An electrical insect killing apparatus comprising a killing unit including means for attracting insects surrounded at least partially by electrode means, and perforate enclosure means for said killing unit detachably joined to switch housing means including switch means for interrupting electrical flow to said killing unit and removable cover means, said removable cover means and said perforate enclosure means each including means that engage and co-act to close the switch means where said perforate closure means and said cover means are joined to said apparatus.

2. The electrical insect killing apparatus in claim 1 wherein said switch means is joined to spring means in a switch carrying means, and said spring means urges said switch means to disengage from said perforate enclosure means.

3. The electrical insect killing apparatus of claim 2 wherein said switch means is also joined to means that engage the interior of said closure means where said closure means is joined to said apparatus.

4. An electrical insect killing apparatus comprising a killing unit including means for attracting insects surrounded at least partially by electrode means, and perforate enclosure means for said killing unit detachably joined to switch housing means including switch means for interrupting electrical flow to said killing unit and removable cover means, said removable cover means and said perforate enclosure means each including means that engage and co-act to close the switch means where said perforate enclosure means and said cover means are joined to said apparatus, wherein said switch means is joined to spring means in said switch carrying means, and said spring means urges said switch means to disengage from said perforate enclosure means, and wherein said switch means is also joined to means that engage the interior of said cover means where said cover means is joined to said apparatus.

5. The electrical insect killing apparatus of claim 4 wherein said perforate enclosure means includes at least one projection means that passes through plate means in said switch housing means, and that engages and closes said switch means where said perforate enclosure means is joined to the apparatus, provided said removable cover means is also joined to the apparatus.

6. The electrical insect killing apparatus of claim 5 wherein the means for attracting insects comprises at least one fluorescent tube means and reflector means disposed adjacent to said fluorescent tube means.

7. The electrical insect killing apparatus of claim 6 wherein the electrode means comprises two concentric, spaced apart meshed grids.

8. The electrical insect killing apparatus of claim 7 wherein the apparatus is vertically disposed, and said enclosure means is coarsely meshed, and is detachably joined at its end opposite said switch housing means to detachable insect collection means.

9. The electrical insect killing apparatus of claim 8 wherein the meshed enclosure means and the two concentric, spaced apart meshed electrode means are cylindrical.

10. The electrical insect killing apparatus of claim 9 wherein the electrical energizing means of the apparatus are mounted on said plate means and beneath said removable cover means.

* * * * *